3,194,800
POLYMERIZATION OF ETHYLENE WITH
CYANIDES
Angus U. Blackham, Provo, Utah, assignor to National
Distillers and Chemical Corporation, New York, N.Y.,
a corporation of Virginia
No Drawing. Filed Oct. 23, 1962, Ser. No. 232,589
15 Claims. (Cl. 260—94.9)

This invention relates to a novel process for polymerizing alpha-olefins to solid, high molecular weight polymers. More particularly, it relates to a novel process for polymerizing ethylene to normally solid high molecular weight polyethylene.

High molecular weight, normally solid polymers of alpha-olefins have been prepared under relatively mild conditions of temperature and pressure by means of a Ziegler-type catalyst system as well as by other known catalyst systems. Such systems include two or more components, e.g., titanium tetrachloride and aluminum triethyl, and require careful regulation of the ratios of the various catalytic components to give the desired results. In addition, Ziegler-type catalyst systems are extremely sensitive to various impurities, such as protonic or active hydrogen compound and oxygen, and consequently, use of such systems is generally limited to non-protonic solvents and requires extensive and complex purification and handling techniques to exclude oxygen and protonic impurities. Further, the extreme pyrophoric nature of Ziegler-type catalyst reducing components, e.g., metal alkyls, necessitates extreme handling and storage precautions for such materials prior to, and during use.

It has recently been reported that alpha-olefins can be polymerized to low molecular weight, normally liquid polymers, principally dimers and trimers, by means of a catalyst system which consists solely of a Group VIII noble metal chloride. (see U.S. 3,013,066 and Belgian 573,530, for example). This catalyst system has numerous advantages over a multi-component catalyst system, such as the Ziegler-type. First, because it contains only one catalytic component, does not require critical regulation of component ratios. Second, it is not sensitive to oxygen or oxygene-containing solvents, and therefore, can be employed in inexpensive, readily available solvents such as methanol, and without any elaborate precautions to exclude oxygen impurities. It should be noted, however, that the catalyst system functions in the presence of water and oxygen gas to convert ethylene to carbonyl compounds rather than fluid polymers. (see German Patent Number 1,049,845). Third, such catalysts can be handled as stable, non-pyrophoric solids, eliminating the need for the elaborate safety precautions required by a Ziegler-type system.

Obviously, it would be of great value to be able to combine the advantages of the above described one-component Group VIII noble metal chloride catalyst with those of the Ziegler-type catalyst to polymerize alpha-olefins with a stable one-component catalyst to high molecular weight, normally solid polymers under relatively mild conditions of temperature and pressure.

Accordingly, it is one object of this invention to provide a method for polymerizing an alpha-olefin to a high molecular weight, normally solid polymer utilizing a stable single component catalyst and relatively mild conditions of temperature and pressure.

It is another object of this invention to provide a method for polymerizing an alpha-olefin to a high molecular weight, normally solid polymer in the presence of a protonic solvent or diluent, including water.

It is a further object of this invention to polymerize ethylene to a high molecular weight, normally solid polymer of unique structure.

These and other objects are accomplished by contacting an alpha-olefin under elevated temperature and superatmospheric pressure with a catalytic amount of a cyanide salt of a metal from Group IB, IIB, or VIII of the periodic system. Handbook of Chemistry and Physics, 42nd Ed., Cleveland, Chemical Rubber, 1960, pp. 448–449.) Such metal groups include palladium, nickel, mercury, platinum, copper, silver, gold, zinc, cadmium, iron, cobalt, ruthenium, rhodium, etc. Preferred cyanide salts are palladium cyanide, nickel cyanide, the mercury cyanides, the platinum cyanides, and the copper cyanides with palladium cyanide being especially preferred. The cyanide salts may be used in pure form or may be supported on a suitable inert support such as alumina, silicon, carbon, and the like. The cyanide salts may also be employed as mixed salts wherein at least one metal is from Group IB, IIB, or VIII, e.g., $Pd(CN)_2 \cdot Ni(CN)_2$, $$Pd(CN)_2 \cdot Hg(CN)_2$$

$Ni(CN)_2 \cdot 2 KCN$, and the like.

The alpha-olefins suitable for the practice of this invention include ethylene, propylene, butene-1, hexene-1, dodecene-1, 3-methyl-1-butene, 4-methyl-1-pentene, vinyl cyclohexene, styrene, 1,3-butadiene, 1,4-hexadiene, 2-methyl-1,3-butadiene, 2-chloro-1,3-butadiene, and the like. Also included as suitable starting materials, are other alpha-olefins containing functional groups, examples of which are vinyl chloride, acrylonitrile, methyl acrylate, allyl acetate, allyl butyrate, allylamine, and the like. Various mixtures of two or more of the above alpha-olefinic compounds may be employed to yield copolymers, if so desired.

In carrying out the process of this invention a small amount of catalyst is charged to a suitable pressure reactor together with an inert diluent, if desired although the diluent is not necessary. The reactor is then charged or pressurized with the alpha-olefin to be polymerized. The contents of the reactor are then heated for a period of time so as to effect polymerization. The reactor is then depressurized and the polymer recovered by precipitation, filtration, or other recovery and isolation means well known to those skilled in the art. If desired, the polymerization may be carried out in continuous fashion, as, for example, by continuously feeding catalyst, reactants, and diluent to or through a reactor and continuously withdrawing polymer therefrom.

The subject polymerization process progresses at a reasonable rate at temperatures between about 50° and 250° C. At higher temperatures there is some tendency for the cyanide salts to decompose; at lower temperatures the yield of polymer tends to decrease. Temperatures between 75° and 140° C. are especially preferred.

Superatmospheric pressure exerts a beneficial effect on both the rate of polymerization and the yield of desired polymer product. Pressures of at least 100 p.s.i. are desirable. Pressures above about 3000 p.s.i. are of little practical advantage. The preferred operating range of pressures is between 500 and 1500 p.s.i.

Suitable diluents are unreactive toward the catalyst, reactants, and products. Included are water, lower alkanols, e.g., methanol, ethanol, isopropanol, butanol, the pentanols, hexanols, octanols, cyclopexanol, etc., hydrocarbons, e.g., benzene, the hexanes, the pentanes, toluene, xylenes, tetralin, cyclohexane, decalin, etc., and other functionalized compounds such as nitriles, e.g., benzonitrile, acetonitrile, propionitrile, etc., amides, e.g., formamide, dimethylformamide, N-methylpyrollidone, etc., ethers, e.g., diethyl ether, methyl isobutyl ether, dimethyl ether of ethylene glycol, tetrahydrofuran, diphenyl ether, etc., chlorobenzene, nitrobenzene, dimethyl sulfone, and others. Preferred reaction media are hydrocarbons, water and the lower alkanols.

Generally, a weight ratio of monomer to cyanide salt of up to about 10,000 in the charge will lead to the desired high molecular weight, normally solid polymers; as one preferred embodiment a ratio by weight between about 1000 and 10 is employed.

The high molecular weight, normally solid polyolefin products resulting from this process are relatively low density, highly branched structures somewhat similar to polymers heretofore produced under conditions of higher temperatures (above about 200° C.) and much higher pressures (above about 500 atmospheres). For example, polyethylene having a density of 0.91 and containing about 4 to 5 methyl groups per 100 carbon atoms can be produced by means of the process of this invention using temperatures below 100° C. and pressures as low as 100 p.s.i. Further, such polymers exhibit weight average molecular weights as high as one million or higher. Such products find wide application for wire coating, insulation, packaging films, molded or blown containers, pipe, household articles, etc.

The following examples are presented for the purpose of illustration, without intent of limitation of the invention. All parts are expressed by weight unless otherwise indicated.

Example I

Palladium cyanide was prepared by mixing solutions of palladium chloride and sodium cyanide according to the published procedure of Jonassen and Sistrunk, J. Phys. Chem., 59, 290 (1955). The resultant yellow gelatinous precipitate was washed, dried at 120° C., and ground to a powder.

In the glass liner of a rocking autoclave 4.14 parts of the powdered $Pd(CN)_2$ was suspended in 43 parts of toluene and the autoclave pressurized to 550 p.s.i. with ethylene. The temperature was increased gradually to 97° C., causing the pressure to increase to 750 p.s.i. Upon shaking the autoclave at 95° to 98° C. for 18 hours, the pressure dropped to 375 p.s.i. The autoclave was then cooled to room temperature, depressurized, and the contents filtered to give a clear filtrate and a grayish-black, solid residue. The filtrate was added to an excess of methanol to yield a white precipitate. Recovery of the precipitate by filtration, followed by drying, yielded 5.0 parts of a solid, white polymeric product.

The solid residue from the original filtration was treated with hot decalin to extract any polymeric material present from the palladium salt residue. The hot extract was filtered from the insoluble residue and then added to an excess of isopropanol to precipitate a white, solid product. Upon drying, 6.6 parts of a white powder was isolated. The polymer could be pressed into films. It possessed a density of about 0.91, and by infrared absorption analysis, exhibited a relatively high degree of chain branching, i.e., about 4 to 5 methyl groups per 100 carbon atoms. Its weight average molecular weight as determined by a light scattering technique was approximately one million.

By means of the gas law it was estimated that about 23 parts of ethylene had been absorbed during the reaction, thereby making the approximate yield of normally solid polymer, based on monomer, approximately 50 percent.

For comparative purposes the above reaction procedure was repeated using as a starting suspension, 1.78 parts of $PdCl_2$ in 86 parts of toluene. The reaction was run over a period of six hours at a temperature of 75° C. The initial ethylene pressure at 75° C. was 1040 p.s.i.; the final pressure at this temperature was 350 p.s.i. By means of the gas law, it was calculated that 0.94 moles of ethylene had been absorbed.

Only a trace of a solid residue was present in the final reaction mixture. This residue was removed by filtration and subsequently found to contain 53 percent palladium. The filtrate was fractionated by distillation and the fractions analyzed by vapor phase chromatography. Based on the ethylene used, the product yields of the reaction, by weight, were as follows:

| | Percent |
|---|---|
| 2-butene } 1-butene } | 91 |
| Isomeric hexenes | 7.8 |
| Benzene | 0.1 |
| Higher polymers of ethylene, e.g., octenes, decenes, etc. | 1.3 |

Example II

The procedure of Example I was repeated using palladium cyanide prepared by dissolving palladium in nitric acid, diluting with water, adding potassium cyanide, followed by filtering, drying, and pulverizing the resultant $Pd(CN)_2$. Reaction conditions and results were as follows:

| | |
|---|---|
| $Pd(CN)_2$, parts | 1.59 |
| Toluene, parts | 86 |
| Initial ethylene pressure, p.s.i. | 410 |
| Final ethylene pressure, p.s.i. | 130 |
| Reaction temperature, ° C. | 76 |
| Reaction time, hr. | 64 |
| Solid polymer, parts | 5.0 |

A film prepared from the polymer was uniform in appearance, tough, and flexible.

Example III

The procedure of Example I was repeated using palladium cyanide prepared in the absence of water by adding a solution of $PdCl_2$ in methanolic HCl to a solution of NaCN in methanol and then removing the methanol by adding toluene and boiling. The resultant suspension of $Pd(CN)_2$ in toluene was further diluted with toluene and then placed in the autoclave to serve as the starting catalyst suspension. Reaction conditions and results were as follows:

| | |
|---|---|
| $Pd(CN)_2$, parts | approx. 1.5 |
| Toluene, parts | 86 |
| Initial ethylene pressure, p.s.i. | 1200 |
| Final ethylene presure, p.s.i. | 290 |
| Reaction temperature, ° C. | 70 |
| Reaction time, hr. | 40 |
| Solid polymer, parts | 7.8 |

A film prepared from the polymer was uniform in appearance, tough, and flexible.

Example IV

The procedure of Example I was repeated using palladium cyanide suspended on alumina. This suspension was prepared by contacting, with vigorous stirring, a suspension of 20 parts alumina in an aqueous solution containing 1.78 parts of $PdCl_2$ with an aqueous solution of 1.3 parts of KCN, filtering the suspended catalyst, washing it free of chlorides with water, and drying it at 150° C. Reaction conditions and results were as follows:

| | |
|---|---|
| $Pd(CN)_2$, parts | 1.59 |
| Toluene, parts | 86 |
| Initial ethylene pressure, p.s.i. | 1450 |
| Final ethylene pressure, p.s.i. | 1250 |
| Reaction temperature, ° C. | 96 |
| Reaction time, hr. | 4 |
| Solid polymer, parts | 8.8 |

A film prepared from the solid polymer was uniform in appearance, tough, and flexible.

Example V

To observe the influence of temperature on the yield of solid polymers, four runs varying only in reaction temperature were made. In each, 1.24 parts of $Pd(CN)_2$ was suspended in 86 parts of toluene, the suspension placed in an autoclave, the autoclave brought to the desired reaction temperature range, and pressurized to 500 p.s.i. with ethylene. After running the reaction for 14 hours, the solid polymeric products were isolated according to the procedure of Example I. Results were as follows:

| | Run No. | | | |
|---|---|---|---|---|
| | 1 | 2 | 3 | 4 |
| Reaction Temperature, °C | 56–63 | 75–85 | 120–130 | 150–160 |
| Solid Polymer, parts | 1.6 | 10.0 | 4.9 | 2.9 |

From these data it can be seen that high molecular weight polyethylenes are produced throughout the temperature range of 56 to 160° C. It also appears that for this particular system, there exists a range of temperature, i.e., about 75 to 85° C. in which the yield of polymer passes through an optimum value.

*Example VI*

To observe the effects of pressure on the yield of solid polymers, three runs were made, according to the procedure of Example I, using widely varying reaction pressures. Reaction conditions and results were as follows:

| | Run No. | | |
|---|---|---|---|
| | 1 | 2 | 3 |
| Pd(CN)$_2$, parts | 1.59 | 1.24 | 1.24 |
| Toluene, parts | 86 | 86 | 86 |
| Initial Ethylene Pressure, p.s.i. | 15 | 240 | 1,470 |
| Reaction Temperature, °C | 90 | 80 | 80 |
| Reaction Time, hr | 19 | 19 | 19 |
| Solid Polymer, parts | tr. | 2.6 | 7.7 |

The foregoing results illustrate the fact that superatmospheric pressures facilitate the rate at which high molecular weight polyethylenes are formed. However, it is evident that only rather low superatmospheric pressures, i.e., on the order of a few hundred p.s.i., are necessary for satisfactory yields of solid, high molecular weight polymers which heretofore have required pressures in the order of 500 atmospheres and above using other catalysts.

*Example VII*

The procedure of Example I was repeated using Decalin, water, and ethanol in place of toluene to serve as the reaction medium and study the effects thereof. Reaction conditions and results were as follows:

| | Run No. | | |
|---|---|---|---|
| | 1 | 2 | 3 |
| Pd(CN)$_2$, parts | 1.59 | 1.59 | 1.59 |
| Reaction Diluent | decalin | water | ethanol |
| Quantity of Reaction Diluent, parts | 90 | 100 | 79 |
| Initial Ethylene Pressure, p.s.i. | 1,450 | 550 | 680 |
| Final Ethylene Pressure, p.s.i. | 1,270 | 460 | |
| Reaction Temperature, °C | 150 | 107 | 90 |
| Reaction Time, hr | 16 | 22 | 12 |
| Solid Polymer, parts | 5.6 | 3.2 | 4.6 |

In each instance the polymer comprised a high molecular weight polyethylene which could be prepared into tough, flexible films. The variety of diluents shown to be suitable illustrates the versatility of this polymerization reaction with respect to the reaction media which can be successfully employed. It is particularly surprising in view of the prior art that water can serve as a reaction medium for such ethylene polymerization.

*Example VIII*

The procedure of Example I was repeated using the cyanide salts of various metals other than palladium. Reaction conditions and results were as follows:

| Catalyst | Ni(CN)$_2$ | Ni(CN)$_2$·4H$_2$O | Hg(CN)$_2$ | Pt(CN)$_2$ | Cu$_2$(CN)$_2$ |
|---|---|---|---|---|---|
| Quantity of Catalyst, parts | 0.55 | 1.83 | 2.53 | 1.24 | 0.9 |
| Solvent | toluene | xylene | toluene | toluene | toluene |
| Quantity of Solvent, parts | 43 | 87 | 86 | 86 | 86 |
| Ethylene Pressure, p.s.i. | 750 | 1,900 | 1,525 | 1,575 | 1,100 |
| Reaction Temperature, °C | 130 | 150 | 145 | 150 | 120 |
| Reaction Time, hr | 16 | 16 | 14 | 14 | 16 |

In each instance, high molecular weight, normally solid polyethylenes were isolated as a product of the reaction.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparing a normally solid polymer of an alpha-olefin which comprises contacting said alpha-olefin compound under a temperature above 50° C. and superatmospheric pressure with a catalytic amount of a catalyst consisting of a cyanide salt of a metal selected from the group consisting of Groups IB, IIB, and VIII of the periodic system.

2. A process for preparing a normally solid polymer of an alpha-olefin which comprises contacting said alpha-olefin under elevated temperature and superatmospheric pressure with a catalytic amount of a catalyst consisting of a cyanide salt of a metal from the group consisting of Groups IB, IIB, and VIII of the periodic system.

3. The method of claim 1 wherein the alpha-olefin is ethylene.

4. The method of claim 1 wherein the reaction is carried out at a temperature of from about 50° C. to about 200° C.

5. The method of claim 1 wherein the reaction is carried out at a pressure of at least about 100 p.s.i.

6. The method of claim 1 wherein the ratio by weight of alpha-olefin to cyanide salt ranges from about 10,000 to about 10.

7. The method of claim 1 wherein the reaction is carried out in the presence of an inert diluent.

8. A process for preparing a normally solid polymer of ethylene which comprises contacting ethylene in the presence of an inert diluent and at a temperature above 50° C. and superatmospheric pressure with a catalytic amount of a catalyst consisting of a cyanide salt of a metal from the group consisting of Groups IB, IIB, and VIII of the periodic system.

9. The process of claim 8 wherein the cyanide salt is palladium cyanide.

10. The process of claim 8 wherein the reaction is carried out at a temperature of from about 50° C. to about 200° C.

11. The process of claim 8 wherein the reaction is carried out at a pressure of at least about 100 p.s.i.

12. The process of claim 8 wherein the ratio by weight of ethylene to cyanide salt ranges from about 10,000 to about 10.

13. The method of claim 8 wherein the reaction is carried out in an inert diluent from the group consisting of hydrocarbons, water, and lower alkanols.

14. A process for preparing normally solid polyethylene which comprises contacting ethylene in the presence of an inert diluent at a pressure between 500 and 1500 p.s.i. and at a temperature between 75° and 140° C. in the presence of a catalyst consisting of palladium cyanide and wherein the ratio by weight of ethylene to said palladium cyanide ranges from about 10,000 to about 10.

15. The process of claim 14 wherein the inert diluent is selected from the group consisting of hydrocarbons, water, and lower alkanols.

References Cited by the Examiner
UNITED STATES PATENTS 2,843,577   7/58   Friedlander ———————— 260—94.9

FOREIGN PATENTS 827,517   2/60   Great Britain.
887,362   1/62   Great Britain.

JOSEPH L. SCHOFER, *Primary Examiner.*